United States Patent [19]
Shibazaki

[11] Patent Number: 5,345,259
[45] Date of Patent: Sep. 6, 1994

[54] CONTOUR EMPHASIS CIRCUIT

[75] Inventor: Kiyoshige Shibazaki, Tokyo, Japan

[73] Assignee: Nikon Corporation, Tokyo, Japan

[21] Appl. No.: 955,253

[22] Filed: Oct. 1, 1992

[30] Foreign Application Priority Data

Oct. 8, 1991 [JP] Japan .................. 3-289230

[51] Int. Cl.[5] .................. H04N 7/18; H04N 5/208
[52] U.S. Cl. .................. 348/26; 348/79
[58] Field of Search .................. 358/37, 96, 166, 182, 358/225, 162; 382/54; H04N 7/18, 5/208

[56] References Cited

U.S. PATENT DOCUMENTS

| | | | |
|---|---|---|---|
| 4,316,215 | 2/1982 | Yasumoto et al. | 358/166 |
| 4,430,665 | 2/1984 | Cochran | 358/37 |
| 4,656,594 | 4/1987 | Ledley | 358/96 |
| 4,748,500 | 5/1988 | Lacoste et al. | 358/37 |
| 4,805,018 | 2/1989 | Nishimura et al. | 358/96 |
| 4,839,725 | 6/1989 | Ueda | 358/166 |
| 4,918,528 | 4/1990 | Oohashi | 358/162 |
| 5,091,967 | 2/1992 | Ohsawa | 358/96 |
| 5,097,327 | 3/1992 | Hasebe | 358/96 |
| 5,103,488 | 4/1992 | Gemello et al. | 358/96 |

Primary Examiner—Tommy P. Chin
Assistant Examiner—Richard Lee
Attorney, Agent, or Firm—Shapiro and Shapiro

[57] ABSTRACT

A contour emphasis circuit receives a video signal from a TV camera for picking up an image formed through a variable magnification factor optical system such as a microscope. The contour emphasis circuit comprises a plurality of contour extractors having different frequency characteristics for generating contour emphasis signals in accordance with the video signal, a selector for selecting one of the plurality of contour extractors in accordance with a magnification factor set to the optical system, and an adder for adding the contour emphasis signal from the contour extractor selected by the selector to the video signal. Optimum contour emphasis is attained in accordance with the magnification factor set to the optical system and the deterioration of an S/N ratio by the contour emphasis is prevented.

3 Claims, 4 Drawing Sheets

CONTOUR EMPHASIS CIRCUIT

BACKGROUND OF THE INVENTION

1. Field of the Invention

The present invention relates to a contour emphasis circuit and more particularly to a technique used in picking up an image of a microscope by a television camera to optimally emphasize a contour in accordance with a change in a magnification factor of an objective lens.

2. Related Background Art

When an image of an optical equipment such as a microscope is to be picked up by a television camera (TV camera), a contour emphasis circuit is usually used to sharpen an image. FIG. 3 shows a configuration of a prior art contour emphasis circuit. In the circuit of FIG. 3, a video signal from a TV camera for picking up an image of a microscope (not shown) is applied to a video signal input terminal 1, and it is supplied to an adder 4 through a video signal processing circuit 2 which carries out white balance adjustment, γ correction and other processing. On the other hand, the video signal from the video signal input terminal 1 is also applied to a contour extractor 3 which extracts a high frequency component in a predetermined frequency range, that is, a contour component, which is supplied to the adder 4, which in turn adds it to the signal from the video signal processing circuit 2 to produce a sum output from a video signal output terminal 5.

In the prior art contour emphasis circuit, there is no adaptive coupling between the optical equipment such as the microscope and the TV camera, and the contour signal component extracted by the contour extractor which has a constant band regardless of the change of a magnification of an objective lens of the optical equipment is added to the video signal. As a result, exact contour emphasis in accordance with the magnification factor of the objective lens is not attained, and in some cases a signal to noise ratio is deteriorated.

This is more fully explained with reference to FIG. 4. A spatial frequency included in an optical image of the microscope usually varies with the magnification factor of the objective lens. That is, a frequency contained in the contour of the image changes. For example, as shown in FIG. 4(a), spatial frequencies transmissive as an image when the magnification factors of the objective lens is 2, 20 and 100 are shown in the abscissa and output responses therefor are shown in ordinate. It is seen that as the magnification factor increases, the transmissive spatial frequency band is narrowed toward the low frequency. Accordingly, as shown in FIG. 4(b), when the contour components extracted by the contour extractor having the constant band characteristic are added to the spatial frequency components of the respective magnification factors, the extract contour emphasis is not carried out, that is, the high frequency components are not fully emphasized, as shown in FIGS. 4(c) and 4(d). Further, the frequency components which do not include the signal components of the image are amplified so that the contour signal cannot be fully extracted and the noise components shown by hatching are amplified. This lowers an S/N ratio.

SUMMARY OF THE INVENTION

It is an object of the present invention to provide a contour emphasis circuit which attains optimum contour emphasis in accordance with a magnification factor of an optical system and prevents the deterioration of an S/N ratio by the contour emphasis.

The present invention provides a contour emphasis circuit which receives a video signal from a television camera for picking up an image formed through a variable magnification factor optical system. The contour emphasis circuit comprises a plurality of contour extractors having different frequency characteristics for generating contour emphasis signals in accordance with the video signal, a selector for selecting one of the plurality of contour extractors in accordance with a magnification factor set to the optical system, and an adder for adding the contour emphasis signal from the contour extractor selected by the selector to the video signal.

Each of the plurality of contour extractors is set to an appropriate frequency characteristic in accordance with the magnification factor of the optical system. An optimum contour extractor is selected by the selector in accordance with the magnification factor set to the optical system, and the contour emphasis signal from the selected contour extractor is added to the video signal by the adder. As a result, the optimum contour emphasis in accordance with the magnification factor of the optical system is attained, and the frequency components which do not contain the signal components are not amplified and the deterioration of the S/N ratio is prevented.

DETAILED DESCRIPTION OF THE PREFERRED EMBODIMENTS

Figure 1:
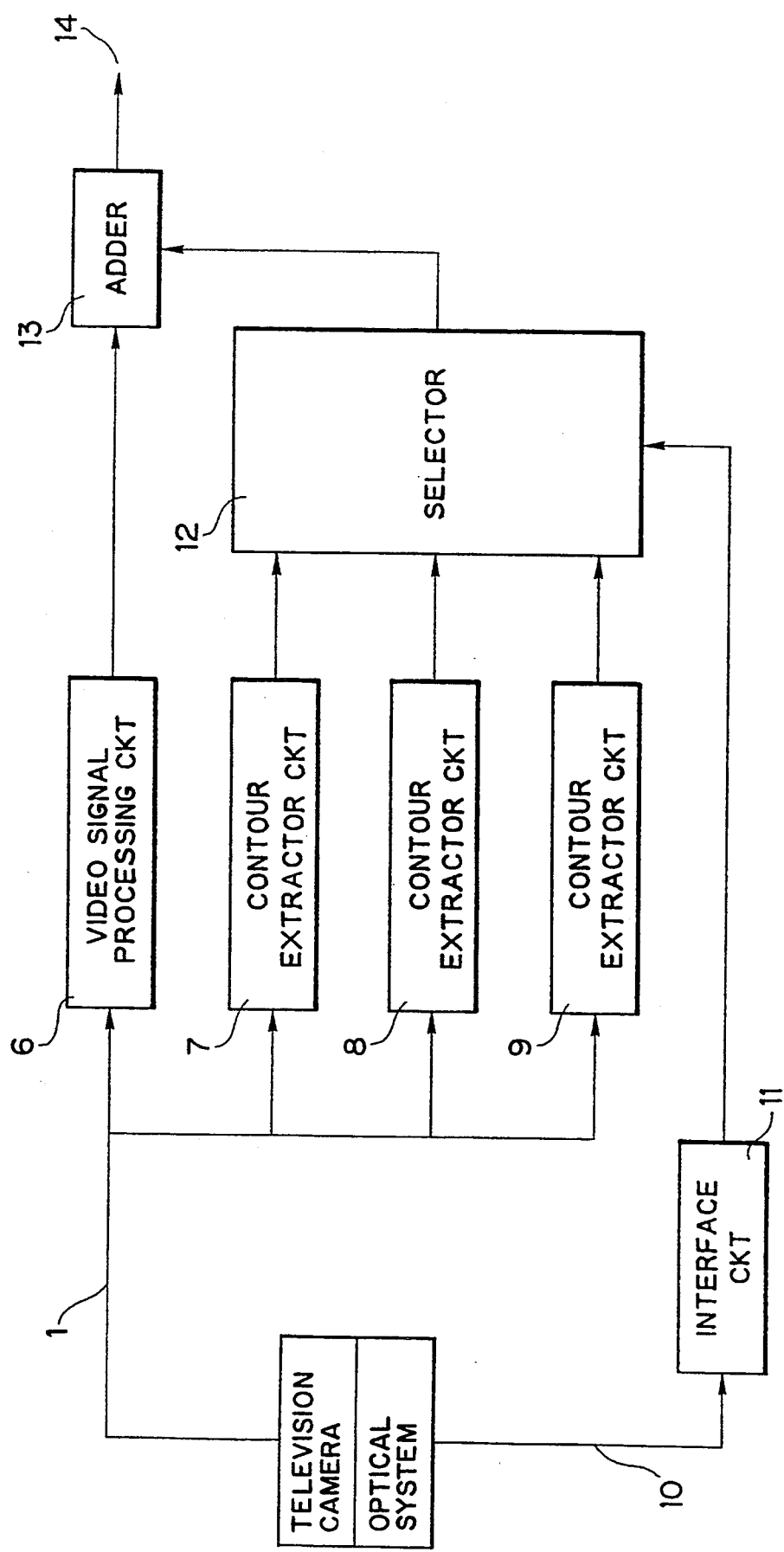
FIG. 1 shows a block diagram of a configuration of a contour emphasis circuit in accordance with a first embodiment of the present invention.

A preferred embodiment of the present invention is now explained with reference to the drawings. FIG. 1 shows a configuration of a contour emphasis circuit in accordance with a first embodiment of the present invention. The circuit of FIG. 1 comprises a video signal processing circuit 6 which receives a video signal from a video signal input terminal 1 to which a video signal from a television camera for picking up an image of a microscope is applied, and contour extractors 7, 8 and 9 having optimum frequency characteristics for respective magnification factors of the microscope. A plurality of objective lenses of different magnification factors are mounted on the microscope and a revolver for selecting an objective lens is provided. The revolver outputs a signal indicating position information of the revolver, and the position information signal is applied to a control signal input terminal 10. The contour emphasis circuit of FIG. 1 comprises an interface circuit 11 for receiving the signal from the control signal input terminal 10, a selector 12 for selecting one of the outputs from the contour extractors 7, 8 and 9 in accordance with the signal from the interface circuit 11, an adder 13 for adding the signal outputted from the selector 12 to the output of the signal processing circuit 13, and a video signal output terminal 14 for outputting the output of the adder 13.

In the present contour emphasis circuit, the video signal sent from a TV camera head mounted on the microscope (not shown) is applied to the video input terminal 1 and processed by the processing circuit 6 for various purposes such as white balance adjustment and γ adjustment, and then it is applied to the adder 13.

The position information of the revolver of the microscope is applied from the control input terminal 10 to the interface circuit 11, which converts the position signal to a signal appropriate for the control of the selector 12 so that one of the outputs of the contour extractors 7, 8 and 9 is selected in accordance with the position of the revolver of the microscope, and the selected output is supplied to the adder 13. The adder 13 adds the video signal from the signal processing circuit 6 to the contour emphasis circuit to produce the corrected video signal at the video signal output terminal 14.

Figure 2:
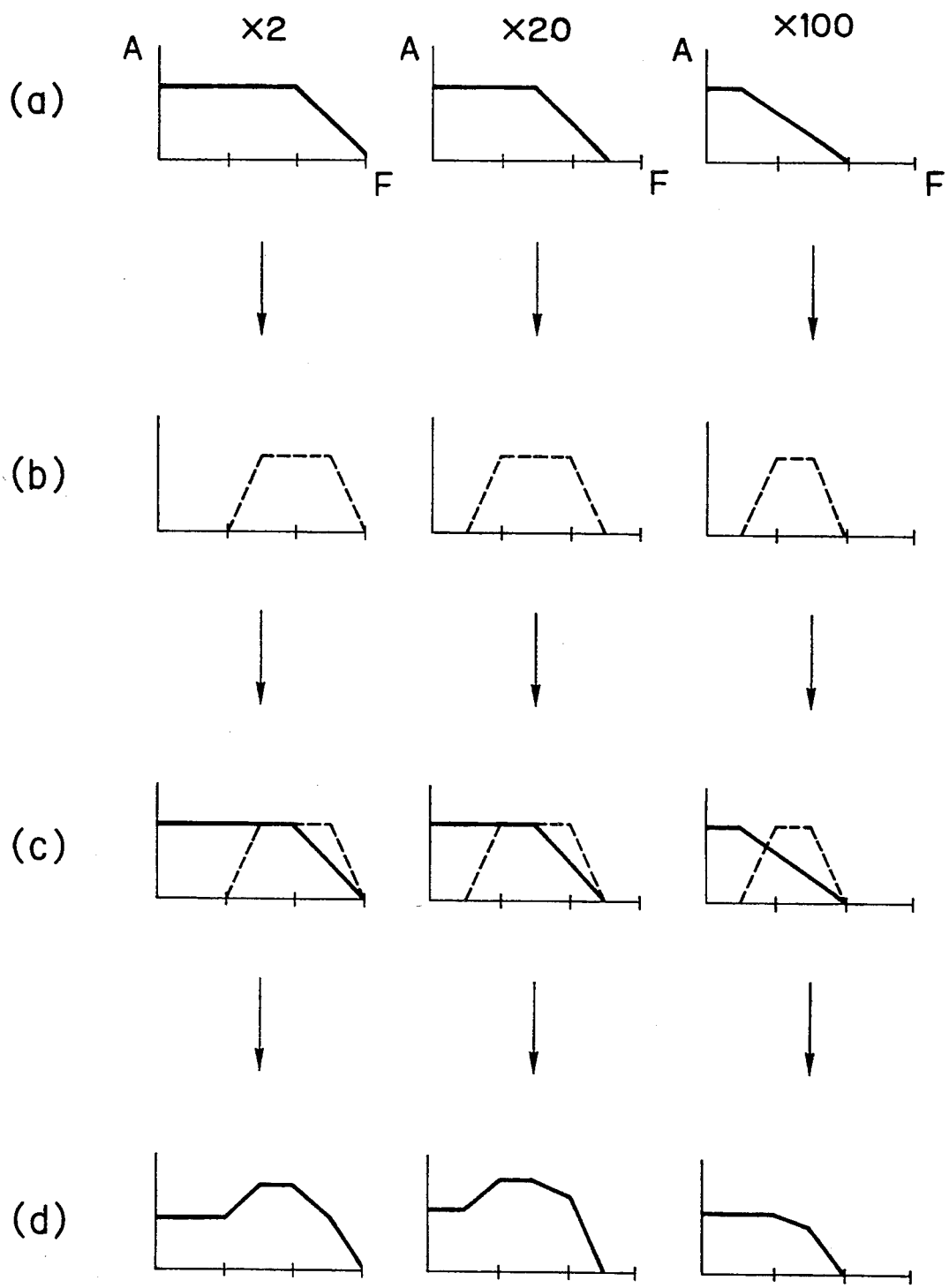
FIG. 2 shows operational characteristic of the contour emphasis circuit of FIG. 1 for various magnifications of an optical system.
Figure 3:
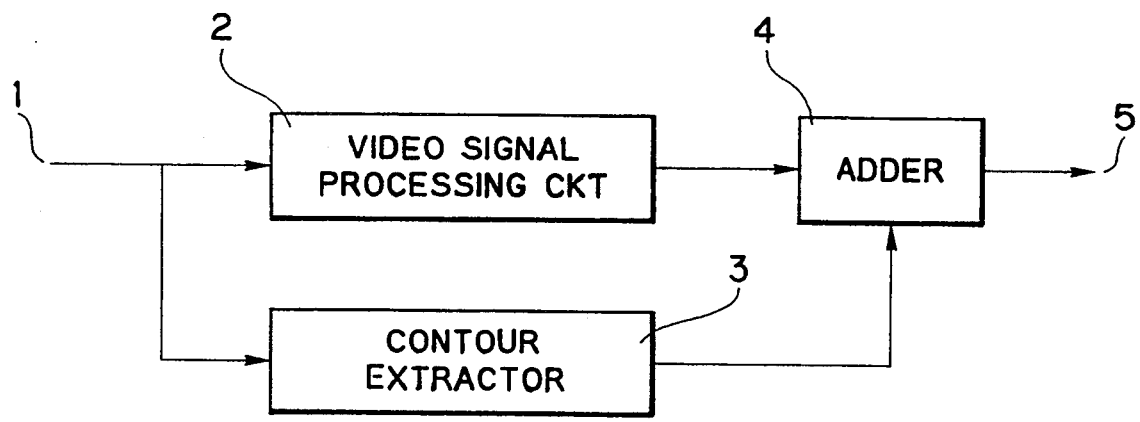
FIG. 3 shows a block diagram of a configuration of a prior art contour emphasis circuit.
Figure 4:
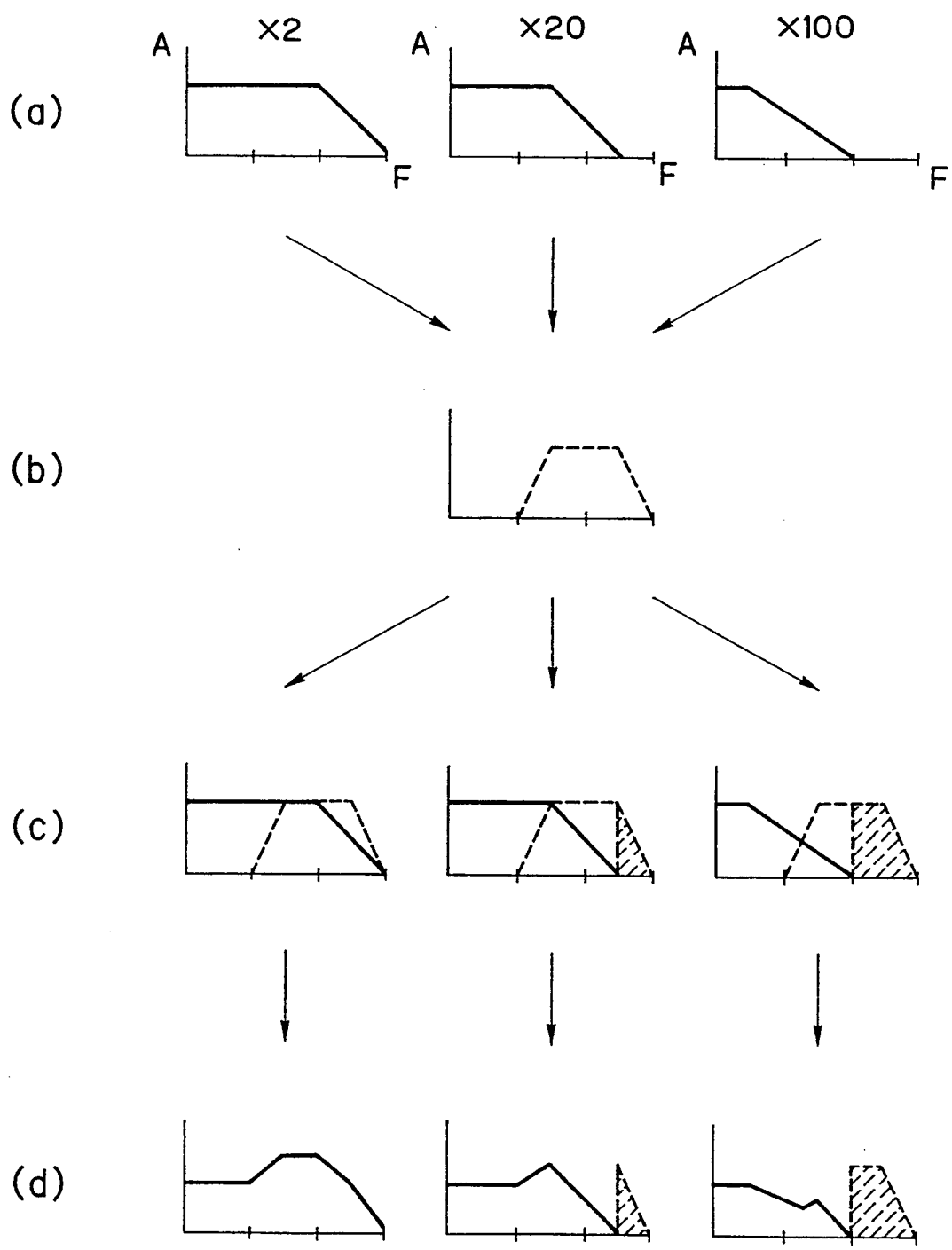
FIG. 4 shows operational characteristics of the prior art contour emphasis circuit for various magnification factors of an optical system.

In the present contour emphasis circuit, assuming that objective lenses having magnification factors of 2, 20 and 100 are mounted at three positions of the revolver of the microscope, the optical characteristics thereof are shown in FIG. 2(a). As the magnification factor rises, the high frequency components of the spatial frequency components contained in the image reduce or are lost.

Thus, the contour extractors 7, 8 and 9 of FIG. 1 are set to exhibit the frequency characteristics shown in FIG. 2(b) for the magnification factors 2, 20 and 100 of the objective lenses. The frequency characteristics are designed such that only the high frequency components of the effective spatial frequency components contained as the image in the spatial frequency components of the video signal for the respective magnification factors are extracted.

The contour emphasis signals extracted by the corresponding contour extractors for the respective magnification factors are added to the original video signal so that the high frequency components of the video signal are emphasized or at least the frequency characteristic of the high frequency components is increased, as shown in FIG. 2(d). In the circuit of FIG. 1, the optimum contour emphasis signal is extracted in accordance with the position of the revolver, that is, the magnification of the objective lens and it is added to the original video signal. Accordingly, proper contour emphasis is attained and the deterioration of the S/N ratio by the contour emphasis is prevented.

In accordance with the present invention, even if the spatial frequency components contained in the image vary with the magnification factor of the optical system such as the microscope, the effective spatial frequency component contained in the image are extracted as the contour emphasis signal for use in the contour emphasis. Accordingly, the optimum and effective contour emphasis is attained in accordance with the magnification factor of the optical system. Further, since the contour emphasis signal is not extracted from the signals outside the effective band, the deterioration of the S/N ratio by the contour emphasis is prevented.

What is claimed is:

1. A contour emphasis circuit for receiving a video signal from a television camera picking up an image formed through a variable magnification factor optical system, comprising:

a plurality of contour extractors having different frequency characteristics for generating respective contour emphasis signals in accordance with the video signal;

a selector for selecting one of said plurality of contour extractors in accordance with a magnification factor to which said optical system is set; and an adder for adding one of said respective contour emphasis signals from said one contour extractor selected by said selector to the video signal.

2. A contour emphasis circuit according to claim 1, wherein said contour extractors correspond to respective magnification factors selectable among a plurality of predetermined magnification factors.

3. A contour emphasis circuit for receiving a video signal from a television camera picking up an image formed through a variable magnification factor optical system, comprising:

contour extractor means for extracting a plurality of contour components of different frequency characteristics from the video signal and generating corresponding contour emphasis signals;

selecting means for selecting one of the contour components in accordance with a magnification factor to which said optical system is set; and adding means for adding one of said contour emphasis signals corresponding to the selected contour component to the video signal.

* * * * *